United States Patent
Hall

[15] 3,669,218
[45] June 13, 1972

[54] PORTABLE STEPS FOR A VEHICLE OR THE LIKE

[72] Inventor: Joshua D. Hall, Miesau Army Depot, Aezmmi-Su, APO New York, N.Y. 09059

[22] Filed: May 19, 1971

[21] Appl. No.: 144,929

[52] U.S. Cl. .................................................. 182/97
[51] Int. Cl. ........................................... E06c 5/02
[58] Field of Search ........................... 182/97, 91, 88

[56] References Cited

UNITED STATES PATENTS 2,657,940  11/1953  Davidson .......................... 182/97
2,967,584  1/1961   Westerlund ....................... 182/97
3,190,392  6/1965   Ashton ............................... 182/97
3,545,567  12/1970  Dohrman ........................... 182/97

*Primary Examiner*—Reinaldo P. Machado
*Attorney*—Robert K. Rhea

[57] ABSTRACT

A step assembly is hingedly connected at its upper end in depending relation to a horizontal platform by a support rod pivotally connected to the platform for swinging movement of the step assembly between an upright utility position and a retracted stored position.

5 Claims, 5 Drawing Figures

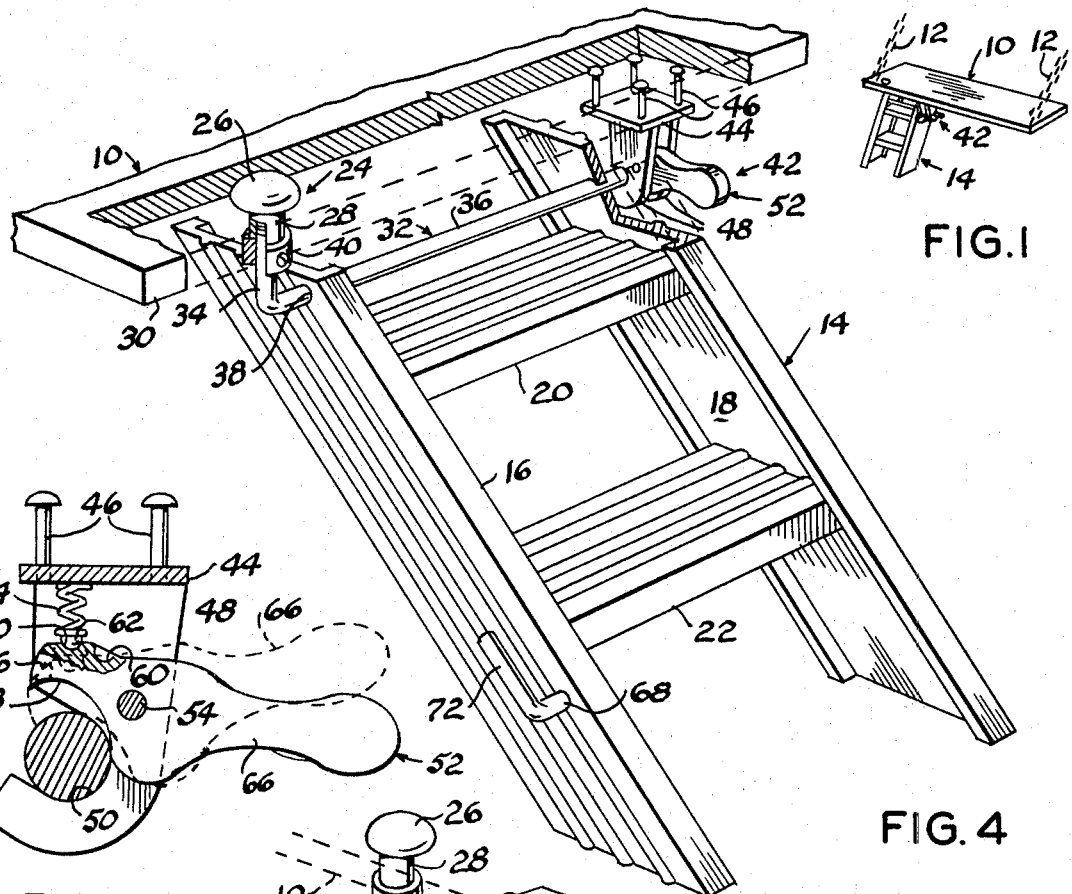
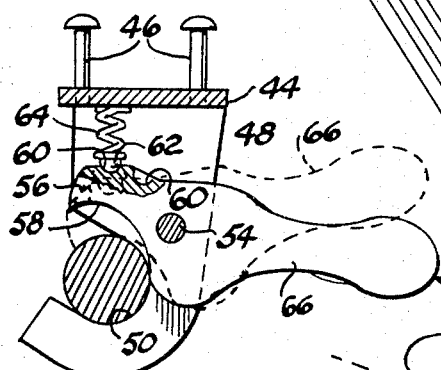
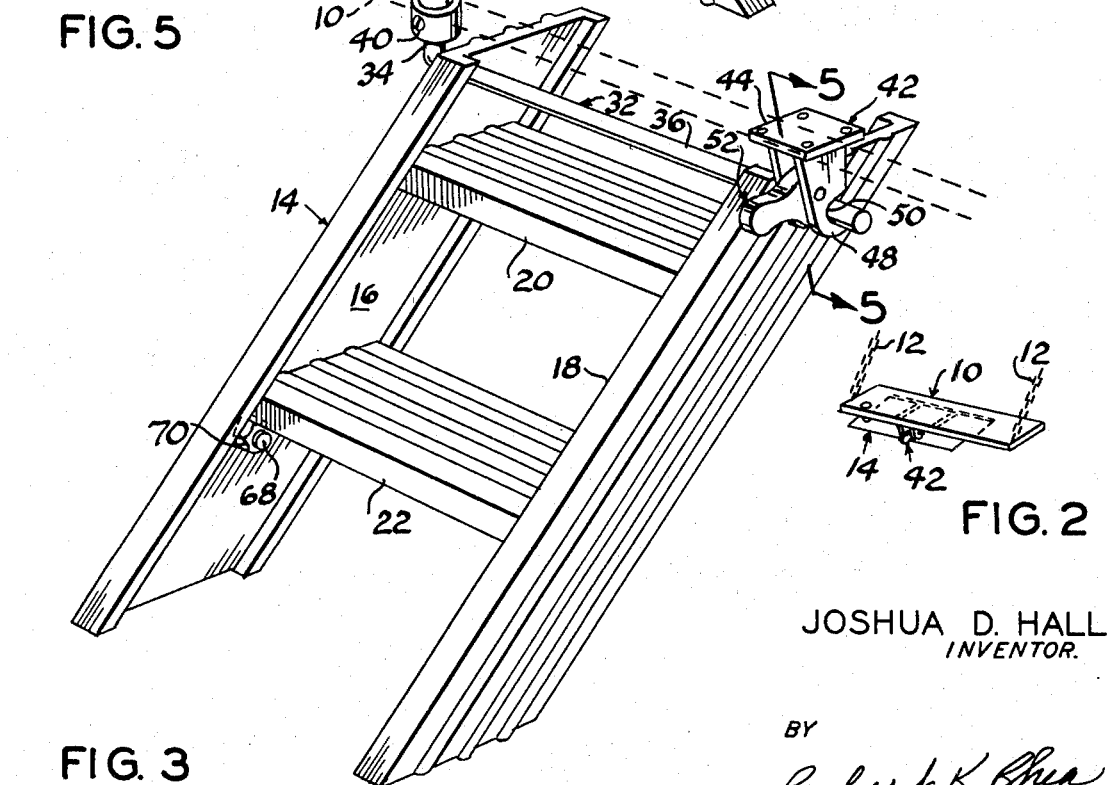

PORTABLE STEPS FOR A VEHICLE OR THE LIKE

BACKGROUND OF THE INVENTION

1. Field of the Invention

The present invention relates to retractable step assemblies in conjunction with a camper body or a horizontal platform, such as the tailgate of a pickup truck, or the like.

A camper body generally comprises a housing or enclosure which is mounted on the load bed portion of a pickup truck wherein the rear wall of the housing is provided with a door closed access opening with its lower extremity disposed adjacent the bottom of the pickup truck load bed and adjacent the hingedly connected truck bed tailgate. The bottom of the camper body and the upper surface of the truck bed and tailgate, when horizontally disposed, is elevated a considerable distance above the surface of the earth supporting the pickup truck. It is, therefore, necessary that a means be provided for easy access to the interior of the camper body. This usually comprises a step assembly preferably having means for retraction and storage while traveling.

2. Description of the Prior Art

Prior patents disclose various types of step assemblies mostly associated with mobile homes, or the like. Some of the step assemblies disclosed by the prior art, such as U.S. Pat. Nos. 3,392,990 and 3,488,066, disclose step assemblies which may be elevated and secured to the exterior wall surface of the enclosure or, are, by a lever arrangement, collapsed to a folded position.

Neither of these patents disclose means for supporting a step assembly beneath a horizontal platform so that the step assembly may be pivoted toward and supported in a horizontal plane adjacent the depending surface of the platform when not in use.

SUMMARY OF THE INVENTION

A pair of side rails, normally extending angularly downwardly and outward from the plane of a horizontal platform, are rigidly connected with horizontal stairtreads. The upper end portion of the side rails are journaled by the horizontal leg portion of an L-shaped support rod pivotally secured by its foot portion to the platform. The other end of the support rod is releasably supported by a latch. Means, secured to the normally depending end of the step assembly, is gripped by the latch for horizontally supporting the step assembly adjacent the depending surface of the platform when the step assembly is raised and pivoted about the vertical axis of the L-shaped support rod.

The principal object of this invention is to provide a retractable step assembly for connection with a horizontal platform adjacent the entryway of a camper body, or the like, which may be pivoted about vertical and horizontal axes between utility and travel positions.

BRIEF DESCRIPTION OF THE DRAWINGS

FIG. 1 is a perspective view of a tailgate in platform forming position illustrating the connected step assembly in operative position;

FIG. 2 is a perspective view illustrating the step assembly in a retracted stored position adjacent the depending surface of the tailgate;

FIG. 3 is a perspective view, of the step assembly, to a larger scale, illustrating, by dotted lines, the relative position of the tailgate rearward edge portion;

FIG. 4 is a fragmentary perspective view of the step assembly from the opposite position, as shown by FIG. 3, with parts of the tailgate and one side rail broken away for clarity; and, FIG. 5 is a vertical cross-sectional view, to a further enlarged scale, partially in elevation, taken substantially along the line 5—5 of FIG. 3 and illustrating, by dotted lines, the locked position of the latch.

DESCRIPTION OF THE PREFERRED EMBODIMENT

Like characters of reference designate like parts in those figures of the drawings in which they occur.

In the drawings:

The reference numeral 10 indicates a horizontal platform which, by way of example, may be the tailgate of a pickup truck, or the like, not shown, normally hingedly connected by one longitudinal side to the load bed of the pickup truck forming a horizontal axis for vertical pivoting movement of the other marginal side of the tailgate toward and away from the surface of the earth. The tailgate is normally supported, when opened, in a horizontal plane by flexible members such as chains 12 extending between the free side edge of the tailgate and the rearward end of the pickup truck.

The numeral 14 indicates a step assembly, as a whole, comprising a pair of side rails 16 and 18 of selected length and cross-sectional configuration which are interconnected in parallel spaced relation by a pair of treads 20 and 22, or the like. The length of the side rails 16 and 18 is preferably such that they extend from a plane adjacent the depending surface of the tailgate 10 and the surface of the earth in a downwardly and rearwardly inclined position. The treads 20 and 22 may be of any selected length and normally define, by their upper or tread surface, a pair of vertically spaced horizontal planes, when the step assembly is in access position.

Hinge means 24 connects the step assembly 14 to the tailgate 10. The hinge means comprises a bolt-like pin 26 having a centrally bored and threaded shank portion 28 projecting downwardly through a suitable aperture formed in the tailgate 10 adjacent its rearward marginal edge 30, as viewed in FIGS. 3 and 4. A substantially L-shaped support rod 32 has the free end of its foot portion 34 externally threaded for engagement with the pin shank 28 forming a vertical axis thus, disposing the leg portion 36 of the rod in parallel depending relation with respect to the depending surface of the tailgate. The rod leg 36 projects through cooperating aligned apertures 38, only one being shown, formed in the upper end portion of the respective side rails 16 and 18 forming a horizontal axis for vertical pivoting movement of the free end portion of the step assembly. A set screw equipped collar 40 surrounds the support rod foot portion 34 adjacent the depending end of the pin shank 28.

Latch means 42 grips the free end of the support rod leg 36 to bear its portion of a load on the step assembly and also secure the step assembly in a stored position as presently described. The latch means 42 comprises a plate 44 which is secured to the depending surface of the tailgate by a plurality of bolts 46. A pair of plate-like arms 48 are secured in spaced-apart parallel depending relation to the depending surface of the plate 44. The depending end portion of each of the arms 48 are transversely slotted in aligned relation, as at 50, with the open end of the slots being directed forwardly toward the pickup truck and upwardly toward the depending surface of the tailgate. The inner limit of the respective slot 50 is preferably formed on a radius substantially equal to the radius of the support rod leg 36 for nesting the latter when disposed within the slots. A lever 52 is pivotally connected intermediate its ends by a rivet 54 extending through the lever and both arms 48. The lever thus may be pivoted vertically about the horizontal axis of the rivet 54. The lever 52 includes a head portion 56 having an elongated recess 58 formed on a radius complemental with the radius of the support rod 36 for partially surrounding the latter and locking it within the slots 50. The surface of the lever head portion opposite its recess 58 is provided with a pair of semicircular recesses 60 for nesting a part spherical portion of a ball 62 secured to one end of a spring 64, secured at its other end in depending relation to the depending surface of the plate 44 between the arms 48. The other end portion of the lever 52 projects rearwardly of the pickup truck beyond the arms 48 and forms a handle portion 66 for moving the lever between a support rod locked and unlocked position wherein the spring 64, ball 62 forms a detent and maintains the lever in the selected position.

A right angular or L-shaped bolt has one of its leg portions 68 extending through one side rail, preferably the side rail 16, and secured by a nut 70 disposing its other leg 72 in spaced-apart parallel relation with respect to the longitudinal axis of the side rail 16 and projecting toward the hinge means 24. Diametrically the L-bolt is substantially equal to the diameter of the support rod 32 and the spacing between the vertical axis of the pin 26 and angle bolt leg 68 is substantially equal to the spacing between the pin 26 and latch arms 48 for the purposes readily apparent.

OPERATION

In operation the step assembly 14, hinge means 24 and latch means 42 are assembled and connected with the tailgate 10, as described hereinabove and shown in the drawings. When it is desired to retract the step assembly 14 for travel, the lever 52 is manually disposed in the solid line position of FIG. 5 and the step assembly free end is manually lifted and pivoted about the vertical axis of the pin 26 with the free end of the step assembly being moved in the direction of the latch means 42 until the L-bolt leg 72 may be disposed within the arm slots 50 thus supporting the step assembly in parallel relation adjacent the depending surface of the tailgate. The lever 52 is pivoted to its dotted line position of FIG. 5 thus locking the step assembly in a locked traveling position.

The step assembly 14 may be released and positioned, as shown in the drawings, by reversing the above described storing action.

It seems obvious that the step assembly 14 and its hinge and latch mounting means may be easily connected with any horizontal surface or platform having space thereunder for accommodating the step assembly.

Obviously the invention is susceptible to changes or alterations without defeating its practicability, therefore, I do not wish to be confined to the preferred embodiment shown in the drawings and described herein.

I claim:

1. A retractable step assembly, for an elevated platform having a depending surface, comprising:
   step members extending downwardly and outwardly from said platform,
      said step members including a pair of side rails interconnected by at least one horizontal tread;
   hinge means connecting the upper end portion of said side rails to said platform for vertical and horizontal pivoting movement of the other end portion of said side rails from a platform access position to a horizontal stored position adjacent the depending surface of said platform; and
   latch means cooperating with said hinge means in supporting said step members in access and stored positions, respectively.

2. A retractable step assembly according to claim 1 in which said hinge means comprises:
   an L-shaped rod having its foot portion vertically disposed and connected with said platform for horizontal pivoting movement of its leg portion in parallel spaced relation below said platform,
   the leg portion of said rod projecting transversely through the upper end portion of said side rails.

3. A retractable step assembly according to claim 2 in which said latch means includes:
   a plate-like arm secured to said platform in depending relation,
      said arm having a transverse slot in one edge surface removably receiving the free end portion of said rod; and,
   lever means pivotally connected with said arm for gripping said rod in cooperation with the slot in said arm.

4. A retractable step assembly according to claim 3 in which said lever means includes:
   a rockable lever having a handle portion, at one end, and having a head portion, at its other end, movable toward and away from said rod by vertical pivoting movement of its handle portion; and,
   resilient means depending from said platform and frictionally engaged with the head portion of said lever for maintaining the head of said lever in rod gripping and released position, respectively.

5. A retractable step assembly according to claim 4 and further including:
   an L-bolt secured to one said side rail opposite its hingedly connected end portion,
   one end portion of said L-bolt projecting laterally of said one side rail in parallel spaced relation for cooperative reception by the slot in said arm.

* * * * *